(12) United States Patent
Hardy

(10) Patent No.: US 7,878,647 B2
(45) Date of Patent: Feb. 1, 2011

(54) FRAME FOR EYEGLASSES, ASSOCIATED TEMPLE, AND METHOD OF MAKING THE SAME

(75) Inventor: Kieran Hardy, Atascadero, CA (US)

(73) Assignee: Live Eyewear, Inc., San Luis Obispo, CA (US)

( * ) Notice: Subject to any disclaimer, the term of this patent is extended or adjusted under 35 U.S.C. 154(b) by 0 days.

(21) Appl. No.: 12/421,391

(22) Filed: Apr. 9, 2009

(65) Prior Publication Data

US 2010/0259718 A1   Oct. 14, 2010

(51) Int. Cl.
*G02C 5/18* (2006.01)

(52) U.S. Cl. .................. 351/117; 351/114; 351/122

(58) Field of Classification Search .......... 351/114, 351/117, 122, 111, 41, 158; 148/563; 264/239, 264/250, 260
See application file for complete search history.

(56) References Cited

U.S. PATENT DOCUMENTS

| | | |
|---|---|---|
| 5,610,669 A | 3/1997 | Kuipers et al. |
| 6,598,969 B2 | 7/2003 | Asano |
| 6,758,562 B1 | 7/2004 | Barnette et al. |
| 7,055,952 B2 | 6/2006 | Fecteau et al. |
| 7,210,776 B2 | 5/2007 | Jannard et al. |
| 7,490,935 B1 | 2/2009 | Vallée |
| 7,553,017 B1 * | 6/2009 | Chen .................... 351/117 |

\* cited by examiner

*Primary Examiner*—Hung X Dang
(74) *Attorney, Agent, or Firm*—Paul B. Heynssens Attorney at Law, PLC (57) ABSTRACT

A frame for eyeglasses, an associated temple, and a method of making the same are provided. The temple includes a receiver, a pliable support member, and a flexible ear piece. The receiver extends from a proximal end of the temple to a second end. The proximal end is configured to rotatably connect to a support section of an eyeglasses frame. The receiver defines a cavity that extends from second end toward the proximal end. The support member has a proximal portion and a distal portion. The proximal portion of the support member is within the cavity. The distal portion of the support member extends out and away from the second end of the receiver. The ear piece extends around the support member and the second end of the receiver. The flexible ear piece and the pliable support member form an integrated ear piece that is shapeable by a wearer.

18 Claims, 6 Drawing Sheets

FRAME FOR EYEGLASSES, ASSOCIATED TEMPLE, AND METHOD OF MAKING THE SAME

BACKGROUND

1. Field of the Invention

The present invention relates to eyeglasses and, more specifically, temples and frames of eyeglasses.

2. Description of Related Art

A typical pair of eyeglasses includes a frame and two optical lenses. The frame includes a support section and two temples. The support section is configured to support the two optical lenses. When worn by the wearer, the support section extends across and is held to the face of the wearer by the two temples and a nose bridge defined by the support section. Each temple extends from an end of the support section along a side of the wearer's head to and between the ear and the rest of the head. A distal end of the temple is configured to rest along a portion of the (outer or external) ear such that the temple, along with the nose bridge, helps to hold and support the pair of eyeglasses to the face of the wearer.

Figure 1A:
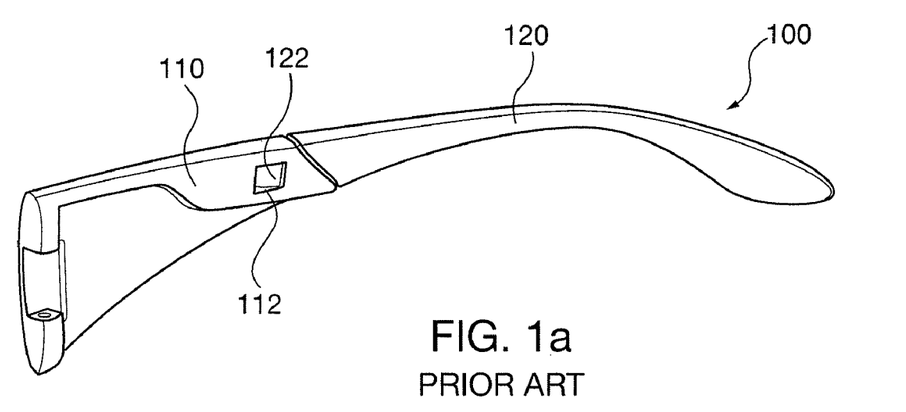
FIG. 1a is an perspective view of an conventional temple assembly.
Figure 1B:
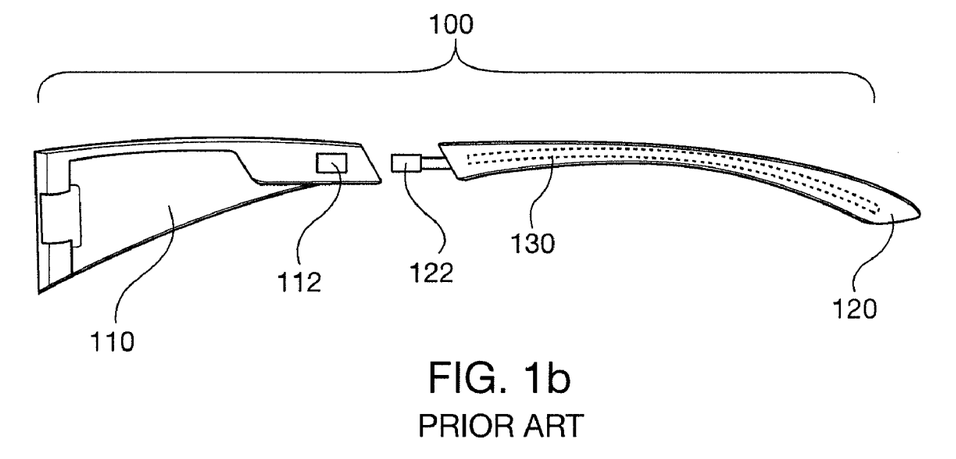

FIGS. 1a and 1b illustrate a known temple assembly. The temple assembly 100 may include a proximal section 110 and a distal section 120 that are configured to snap together. The proximal section 110 may be a molded piece of rigid plastic that defines a female end 112. The distal section 120 may be a molded piece of a flexible material that includes an insert 130 in the form of a brass rod. During assembly, the female and male ends 112, 122 are mated together forming the temple assembly 100.

BRIEF SUMMARY

Embodiments of the present invention provide a temple, eyeglasses that include the temple and method of making the same. It is believed that the temple according to the embodiments described herein is an improvement in strength and/or appearance over the conventional temple having the two separately molded pieces that are configured to snap together.

According to an embodiment of the present invention, the temple includes a receiver, a pliable support member, and a flexible ear piece. The receiver extends from a proximal end of the temple to a second end. The proximal end is configured to rotatably connect to a support section of an eyeglasses frame. The receiver defines a cavity that extends from second end toward the proximal end of the temple. The pliable support member has a proximal portion and a distal portion. The proximal portion of the pliable support member is within the cavity. The distal portion of the pliable support member extends out and away from the second end of the receiver. The flexible ear piece extends around the pliable support member and at least the second end of the receiver. The flexible ear piece and the pliable support member form an integrated ear piece that is shapeable by a wearer.

The receiver may include a mating portion that extends from the second end of the receiver toward the proximal end of the temple. The flexible ear piece may extend around the mating portion. In some embodiments, the mating portion includes one or more locking ribs that form one or more mechanical locks between the flexible ear piece and the receiver such that the flexible ear piece and the receiver are locked together. In other embodiments, instead of or addition to the mechanical locks, a chemical bond may exist between the mating portion of the receiver and the ear piece.

The receiver may include a main body that extends from the proximal end of the temple to the mating portion. The mating portion and the main body may define a shoulder between the two that includes a lateral surface. An end of the ear piece may be in direct contact with the lateral surface.

The main body may include a top surface, a bottom surface, an inner side surface, and an outer side surface. The ear piece may include a top surface, a bottom surface, an inner side surface, and an outer side surface. In some embodiments, the top surface of the main body and the top surface of the ear piece may form a continuous top surface of the temple that extends from the proximal end of the temple to a distal end of the temple. The bottom surface of the main body and the bottom surface of the ear piece may form a continuous bottom surface of the temple that extends from the proximal end of the temple to the distal end of the temple. The inner side surface of the main body and the inner side surface of the ear piece may form a continuous inner side surface of the temple that extends from the proximal end of the temple to a distal end of the temple. The outer side surface of the main body and the outer side surface of the ear piece may form a continuous outer side surface of the temple that extends from the proximal end of the temple to a distal end of the temple.

The cavity defined by the receiver may be shaped to correspond to the proximal portion of the pliable support member. Moreover, in some embodiments, the cavity and the proximal portion of the pliable support member are shaped to form one or more mechanical locks between the receiver and the proximal portion of the pliable support member such that the proximal portion of the pliable support member is locked within the cavity.

Another embodiment provides a pair of eyeglasses that includes a first optical lens, a second optical lens, and a frame. The frame includes a support section, a first temple, and a second temple. The support section is configured to support the first and second optical lenses. Each temple includes a receiver, a support member, and an ear piece as discussed above. The support section and receiver of each temple may be of a first material. The support member of each temple may be of a second material that is different than the first material. The ear piece of each temple may be of a third material that is different than the first material and the second material. For example, according to an embodiment of the present invention, the first material is a rigid plastic, the second material is a pliable material, and the third material is a flexible material. As another example, the support member may be a rod, such as a brass rod.

In yet another embodiment, a method for forming a temple for an eyeglasses frame is provided. The method may include providing a first mold defining a cavity; positioning a proximal portion of a support member within the cavity of the first mold; filling the cavity of the first mold with a first resin including surrounding the proximal position of the support member with the first resin in order to form a receiver that has a shape of the first cavity and that surrounds the proximal portion of the support member; providing a second mold defining a cavity; positioning a mating portion of the receiver and a distal portion of the support member in the second mold, the second mold defining a cavity; filling the cavity of the second mold with a second resin including surrounding the mating portion of the receiver and the distal portion of the support member with the second resin in order to form an ear piece that has a shape of the second cavity and that surrounds the mating portion of the receiver and the distal portion of the support member.

The operation of filling the cavity of the first mold with a first resin may include the first resin being of a rigid plastic material and the operation of the filling the cavity of the second mold with a second resin may include the second resin being of a flexible material.

The operation of providing a first molding defining a cavity may include the cavity defining the mating portion having one or more locking ribs. The operation of filling the cavity of the first resin to form the receiver may include forming the receiving having a mating portion with one or more locking ribs. In such an embodiment, the operation of filling the cavity of the second mold with a second resin to form an ear piece that surrounds the mating portion may include surrounding the one or more locking ribs such that the receiver and ear piece are locked together. In yet another embodiment, the operation of positioning a proximal portion of a support member within the cavity of the first mold may include the support member being pliable.

BRIEF DESCRIPTION OF THE SEVERAL VIEWS OF THE DRAWINGS

Reference will now be made to the accompanying drawings, which are not necessarily drawn to scale, and wherein:

FIG. 1b is a partial exploded view of FIG. 1a;

FIG. 3a is a perspective view of one of the temples of the pair of eyeglasses of FIG. 2;

FIG. 3b is a side view of the temple of FIG. 3a;

FIG. 3c is a top view of the temple of FIG. 3a;

DETAILED DESCRIPTION

The present invention or inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 2:
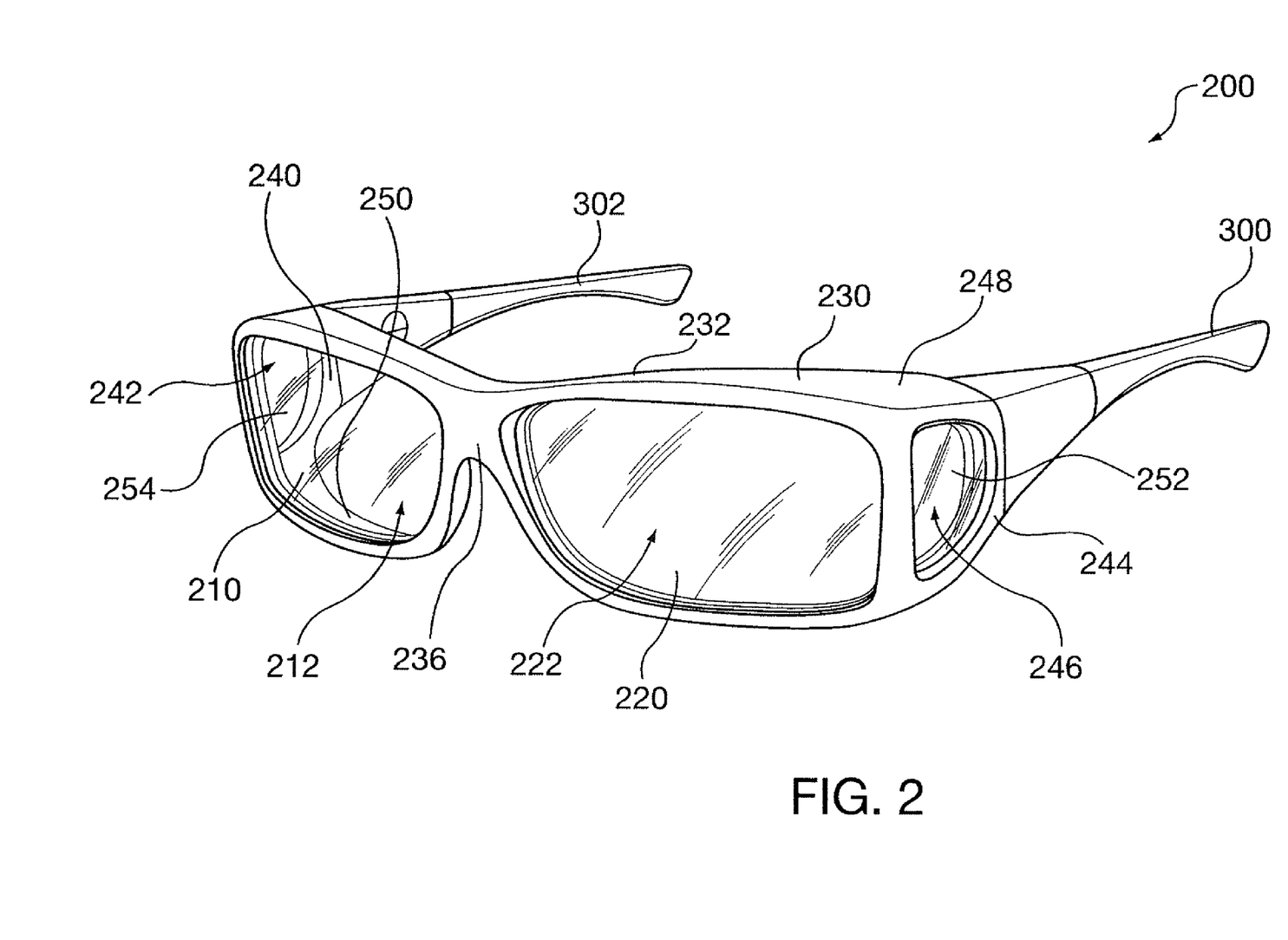
FIG. 2 is a perspective view of a pair of eyeglasses according to an exemplary embodiment.
Figures 3A, 3B, 3C:
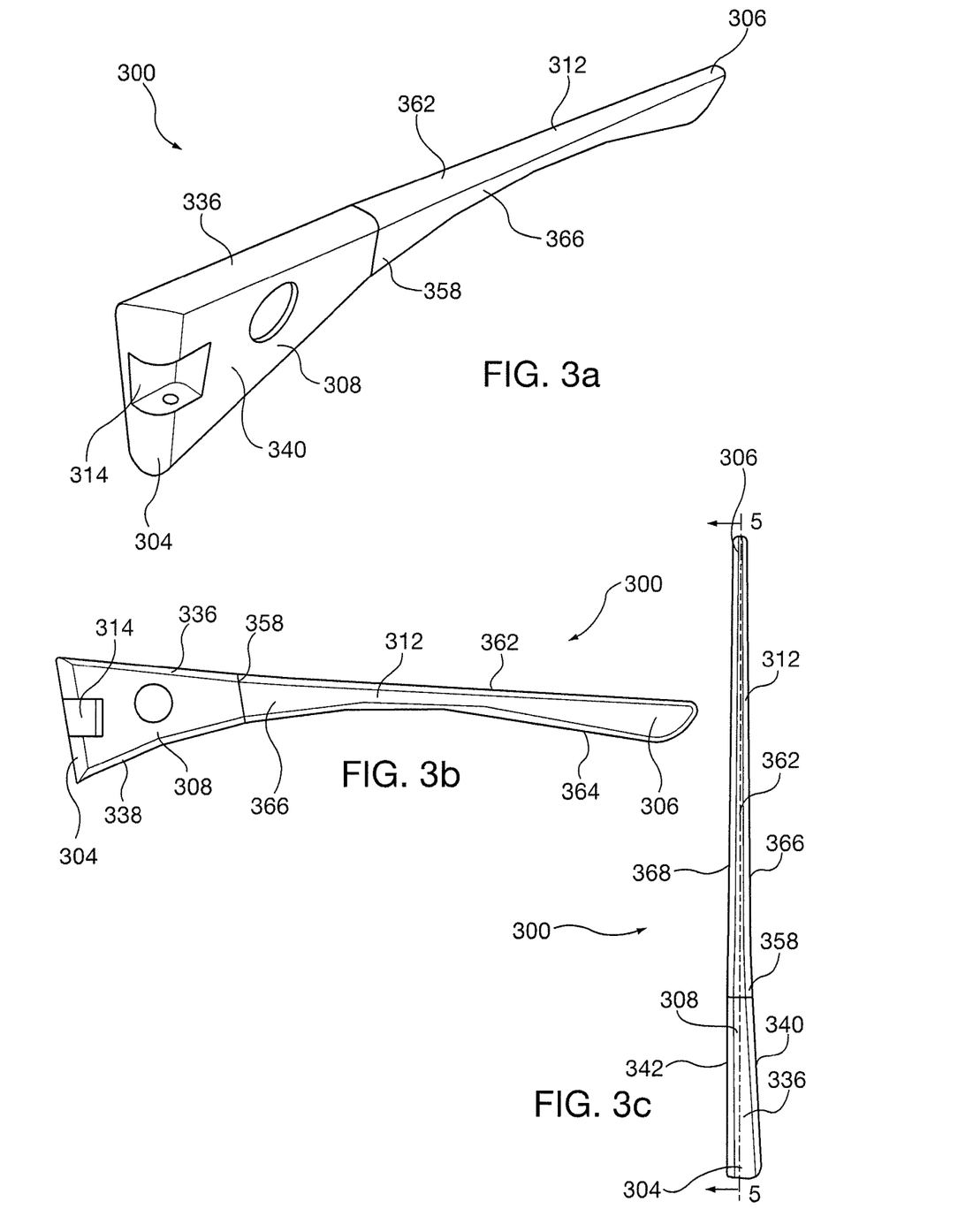

Embodiments of the present invention relate to a new and improved temple, eyeglasses that include a new and improved temple, and methods of making the same. Eyeglasses may vary in function and design. For example, eyeglasses may include sunglasses, prescription glasses, safety glasses, or combination thereof. Eyeglasses may include big frames, minimal frames and/or small lenses or large lenses. FIG. 2 illustrates an example of a pair of eyeglasses 200 that may include a temple according to an embodiment of the present invention. However, it is understood that the pair of eyeglasses of FIG. 2 is only an example and that the function and design of the eyeglasses that may incorporate or use a temple according to an embodiment of the present invention may vary.

The pair of eyeglasses 200, according to FIG. 2, includes a first optical lens 210, a second optical lens 220, and a frame 230. The frame 230 includes a support section 232, a first temple 300, and a second temple 302. As explained further below, a temple 300, 302 is connected to each end of the support section 232. The support section 232 is configured to support the first and second optical lenses 210, 220. For example and as illustrated, the support section 232 may define a first opening 212 configured to receive and hold the first optical lens 210 and a second opening 222 configured to receive and hold the second optical lens 220. In other embodiments, rather than define complete openings as in the illustrated embodiment, the support section may define partial openings or otherwise be configured to extend only partially around or along a portion of the optical lenses. The frame 230 further includes a nose bridge 236. The nose bridge 136 may be an integral part of the support section 232 such as in the illustrated embodiment where the nose bridge 236 is defined by an arched portion of the support section 232 extending between the first and second optical lenses 210, 220. In other embodiments, the nose bridge may be defined by a pair of pads extending from the support section or the optical lenses.

In some embodiments, such as the illustrated embodiment, the support section 232 may further include two side ends 240, 244, a top rim 248, and a bottom rim 250, each of which extends at an angle, e.g., 45-90°, from the rest of the support section 232 and the optical lenses 210, 220. The side ends 240, 244 are generally configured to provide protection from hazards coming from the sides, e.g., light, glare, or a foreign object. As illustrated, each the side end 240, 244 may define an opening 242, 246 for receiving another optical lens 252, 254. The top rim 248 is generally configured to provide protection from hazards coming from the top, e.g., light, glare, or a foreign object. The bottom rim 250 is generally configured to provide protection against hazards coming from the bottom, e.g. light, glare, or a foreign object. Overall, the support section 232, including the two side ends 240, 244, a top rim 248, and the bottom rim 250 may help to provide 360° protection to the wearer of the pair of eyeglasses 200.

The frame 230 may be configured to fit over a second pair of eyeglasses (not illustrated). For example, the optical lenses of the first pair of eyeglasses may be colored, darkened, and/or polarized in order to protect the wearer from light, such as sunlight. The optical lenses of the second pair of eyeglasses may be configured to correct the wearer's vision, i.e., the optical lenses may be according to a particular prescription in order to compensate for the near-sightedness, far-sightedness, or other vision defect of the wearer. The wearer may wear the second pair of eyeglasses to correct his or her vision and then wear the first pair of eyeglasses over the second pair in order to protect his or her eyes from the sunlight. Alternatively, the optical lenses of the first pair of eyeglasses may be clear and not according to any prescription such as the optical lenses typically found in safety glasses.

Referring now more specifically to the temple, as illustrated to FIGS. 3a through 6, the temple 300 may extend from a first end 304, also referred to herein as the proximal end, and a second end 306, also referred to herein as the distal end. The distance from the proximal end 304 to the distal end 306 defines the length of the temple. Although the length of the temple may vary between embodiments, in general, the temple is long enough to extend at least from the support section of the frame that is in front of the wearer's face to the external ear of the wearer. The temple may be long enough to extend beyond the external ear allowing for the distal end of the temple to be curved such that at least a portion of the temple extends around the rear side of the external ear.

According to the illustrated embodiments, the temple 300 includes a receiver 308, a support member 310, and an ear piece 312. The receiver 308 extends from a first end 304 to a second end 318. The first end of the receiver 308 defines the first end of the temple 300. Therefore, in the figures, both the first end of the receiver 308 and the first end of the temple 300 are referred to with the same reference numeral, 304. The first end 304 of the receiver is configured to connect with an end of the support section.

For example and as illustrated, the first end 304 may define a cavity 314 configured to receive a portion of the end of the support section, such as a protrusion or extension. The first end 304 may also define additional openings above and below the cavity 314 for receiving the ends of a pin or rod. The rod is configured to extend from the top opening through a channel in the portion of the support section held within the cavity to the bottom opening. The rod helps to hold the temple and support section together while allowing the temple to rotate relative to the end of the support section, referred to herein as being "rotatably connected." The illustrated embodiment provides only an exemplary structure for rotatably connecting the temple and the support section. One skilled in the art would appreciate various other structures that may provide the same type of connection between the temple and support section. As another example, the receiver may define an opening extending from a top surface or a bottom surface of the receiver configured to receiver a screw or other rod that is supported by the support section.

At the second end 318 of the receiver, the receiver 308 defines a cavity 320 configured to hold at least a portion of the support member 310. For example, the cavity 320 may define an opening at the second end and extend longitudinally (i.e., along the length of the temple) toward the proximal end 304 of the temple for a predetermined distance.

Figure 5:
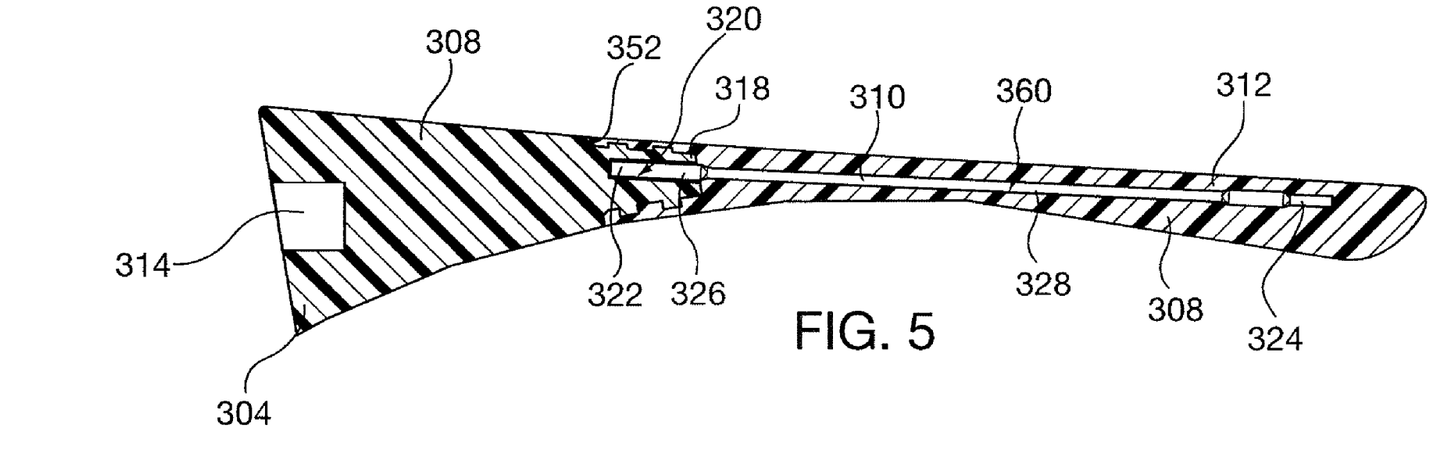
FIG. 5 is a cross-sectional view of FIG. 3b.
Figure 6:
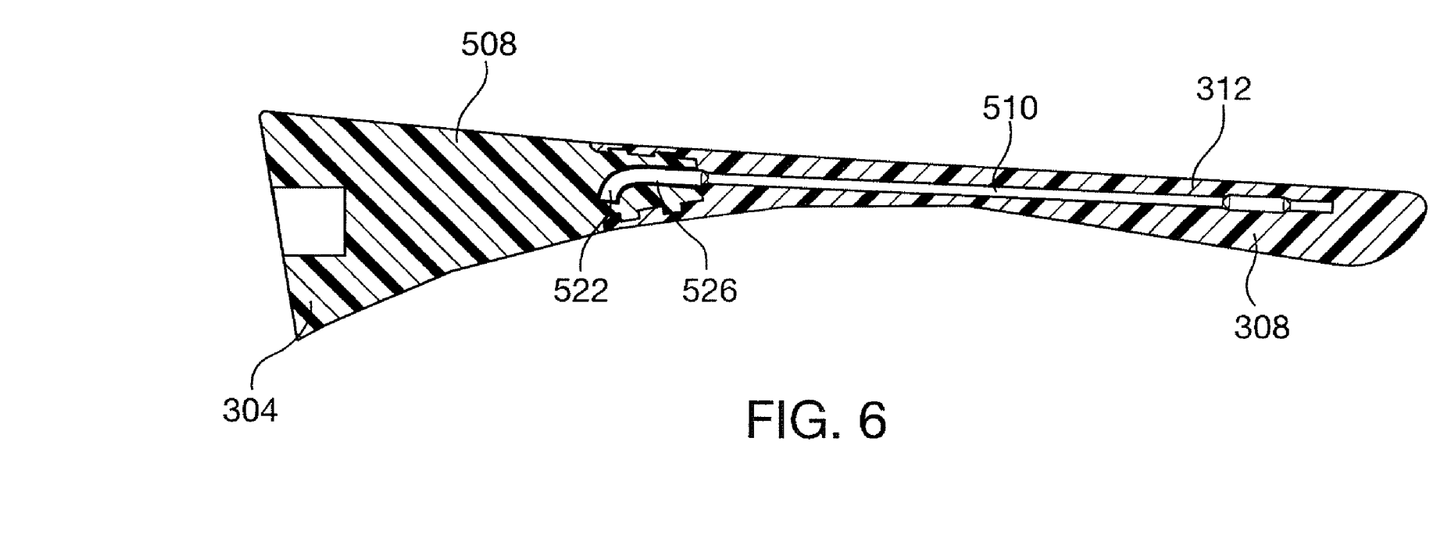
FIG. 6 is a cross-sectional view of another embodiment of the present invention.

The support member 310 extends from a first end 322, e.g., as illustrated in FIG. 5, to a second end 324 and defines a proximal portion 326 and a distal portion 328. The proximal portion 326 is held within the cavity 320 of the receiver. The shape of the cavity may correspond to the shape of the proximal portion. For example, the proximal portion 326 may be a cylindrical rod and the cavity may cylindrical in shape such that the proximal portion 326 occupies substantially the entire cavity and is surrounded by and in direct contact with the material of the receiver. As explained in more detail below, the receiver may be a plastic material formed by a molding process. One method for forming a cavity in the receiver to correspond with the shape of the proximal portion is by molding the receiver around the proximal portion 326. Due to the presence of the proximal portion 326, as the resin is inserted into the mold, the resin surrounds the proximal portion and solidifies forming a cavity 320 that corresponds with the shape of the proximal portion 326.

In the above example and in the illustrated embodiment of FIG. 5, the support member 310 is a cylindrical rod and the cavity 320 has a cylindrical shape. In such an embodiment, the support member 310 is restricted from moving in a longitudinal direction toward the proximal end 304 of the receiver due to the end of the cavity 320 and the material of the receiver. Similarly, the support member 310 is restricted from moving in a lateral direction (i.e., a direction perpendicular to the length of the temple) due to the sides of the cavity 320 and the material of the receiver. In some embodiments, depending on the materials of the receiver and the support member and the molding process, a bond or lock may exist between the receiver and the support member further restricting or preventing the separation of the support member and the receiver. For example, a chemical bond (i.e., a combining of atoms and molecules of the different material) and/or a mechanical lock (i.e., the shapes of the two elements prevent movement relative to each other in at least one direction) may be used.

In some embodiments, the support member and the cavity may be specifically configured to form a mechanical lock to prevent the support member for being moved away or out of the cavity. For example, in the embodiment of FIG. 6, the first end 522 of the support member 510 and, thus, the end of the proximal portion 526 may be turned, hooked, or otherwise shaped to create an expanded cross-section (as seen in a lateral plane) of the proximal portion 526 of the support member relative to the rest of the proximal portion 526 of the support member. In such an embodiment, the expanded cross-section of the end 522 of the proximal end is prevented or "locked" from moving longitudinally because the expanded cross-section is substantially surrounded by the material of the receiver 508.

The support member may be pliable. In such embodiments, the support member may be referred to as a pliable support member. "Pliable" as the term is used herein describes a characteristic in which the element is capable of being bent, flexed, or otherwise shaped to a new overall shape without breaking and substantially holding the new overall shape. This is in contrast to a flexible element that is also cable of being bent and flexed without breaking but can not hold the new shape. The pliability of an element, such as the support member, may be based on the overall size and dimensions of the element, e.g., a rod with a smaller diameter may be more pliable than a rod with a larger diameter, and the material of the element, e.g., a brittle material is not likely to form a pliable element regardless of the shape and size of the element. Again, as an example, the pliable support member may be a brass rod.

Figures 4A, 4B, 4C:
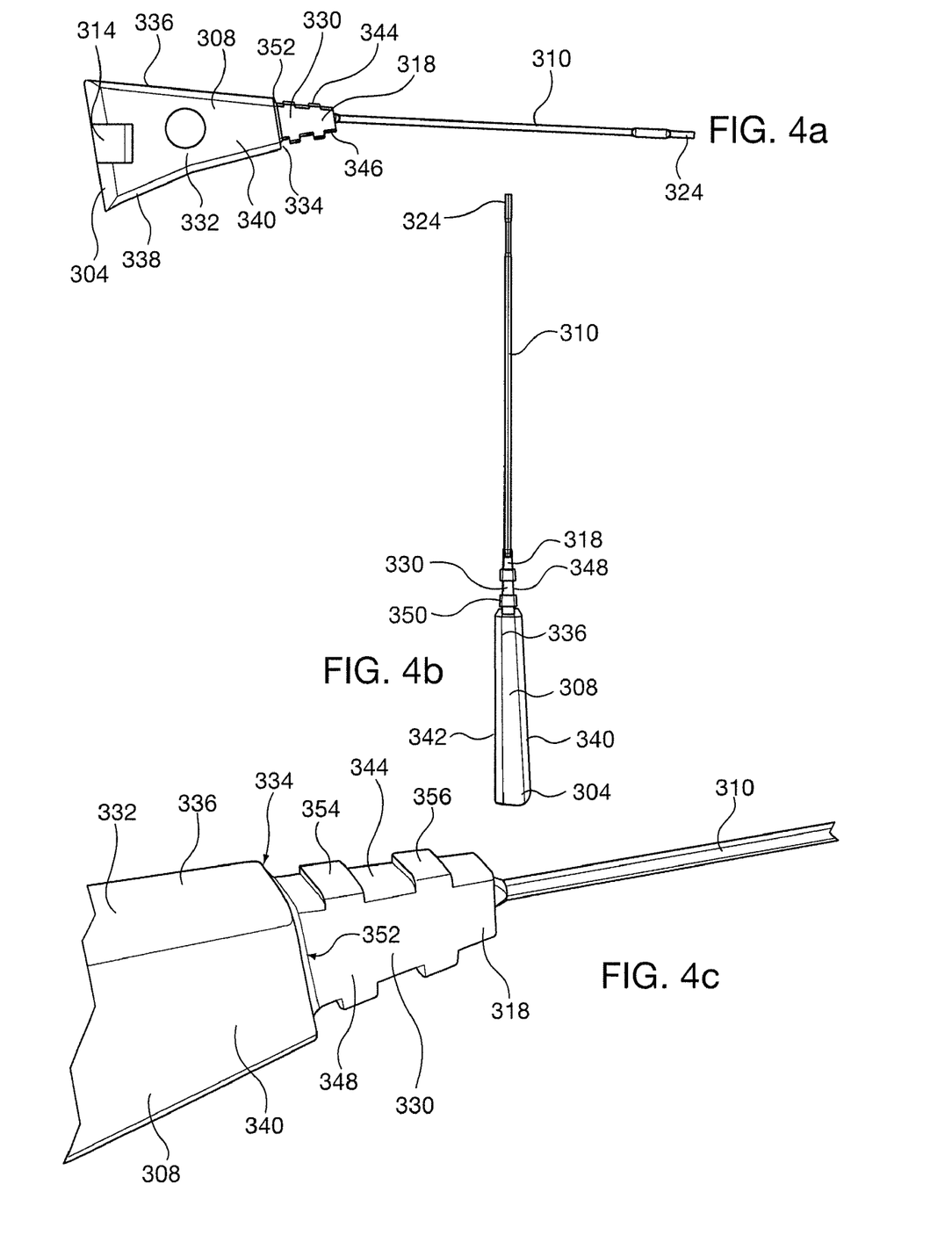
FIG. 4a is the view of FIG. 3b with the ear piece removed.
FIG. 4b is the view of FIG. 3c with the ear piece removed.
FIG. 4c is a partial perspective view of the temple of FIG. 3a illustrating the support member extending into the cavity of the receiver and the ear piece extending over the mating portion of the receiver and a portion of the support member.

Referring back to the receiver, as shown best in FIG. 4c, the receiver 308 may define a mating portion 330 extending from the second end 318 longitudinally toward the proximal end 304 of the temple. In the illustrated embodiment, the receiver 308 extends from the second end 308 to a shoulder 334 defined between the mating portion 330 and the rest of the receiver, referred to as the main body 332.

The shoulder 334 is formed by an abrupt change in the cross-section of the receiver between the main body 332 and the mating portion 330. More specifically, the main body 332 may include a top surface 336, a bottom surface 338, an inner side surface 340 (facing toward the wearer), and an outer side surface 342 (facing away from the wearer). Together the top surface 336, the bottom surface 338, the inner side surface 340, and the outside side surface 342 define the cross-section (as seen in a lateral plane) of the main body. In the illustrated embodiments, the top surface 336 and the bottom surface 338 in the main body 332 are angled or sloped toward one another such that as the main body 332 extends from the proximal end 304 of the temple toward the second end 318 of the temple, the cross-section gradually gets smaller.

Similarly, the mating portion may have a top surface 344, a bottom surface 346, an inner side surface 348, and an outer side surface 350. Together, these surfaces 344, 346, 348, 350 define the cross-section (as seen in a lateral plane) of the mating portion. In the illustrated embodiments, at the interface between the mating portion 330 and the main body 332, the cross-section of the mating portion 330 is smaller than the cross-section of the main body. The difference between the cross-sections creates the shoulder 334 that includes a surface 352 extending laterally from and around the mating portion 330.

The mating portion 330 may include one or more ribs 354, 356. The ribs 354, 356 are configured to form a lock with the ear piece 312 and, thus, the ribs 354, 356 are also referred to as locking ribs. In general, a rib 354, 356 is a lateral extension in the mating portion 330. For example and as illustrated, a rib 354, 356 may extend from the top surface 344 and the bottom surface 346 of the mating portion. As another example, each locking rib may extend completing around the mating portion 330. As yet another example, a locking the rib may extend from just one surface, such as the top surface, the bottom surface, or one of the side surfaces.

The ear piece 312 extends from a first end 358 to a second end 306 around the mating portion 330 of the receiver and the distal portion 328 of the support member. The second end of the ear piece defines the distal end of the temple. Therefore, in the figures, both the second end of the ear piece and the distal end of the temple are shown with the same reference numeral, 306. The ear piece 312 defines a cavity 360 in which the mating portion 330 and the distal end 328 of the support member is held. The shape of the cavity 360 that forms the mating portion 330 may substantially correspond to the shape of the mating portion 330. For example, the cavity 360 may take the shape of the surfaces 344, 346, 348, 350 and the one or more ribs 354, 356. As explained in more detail below, the ear piece is a piece of plastic (e.g., a soft or elastomeric material) formed by a molding process. One method for forming a cavity in the ear piece to correspond with the shape of the mating portion and the distal portion of the support member is by molding the ear piece around the mating portion 330 and the distal portion 328 of the support member. Due to the presence of the mating portion 330 and the distal portion 328 of the support member, as the resin is inserted into the mold, the resin surrounds the mating portion 330 and the distal portion 328 of the support member and solidifies forming a cavity 360 that corresponds with the shape of the mating portion 330 and the distal portion 328 of the support member.

Because the ear piece 312 surrounds the mating portion 330, the ear piece 312 is immovable in any lateral direction relative to the receiver 308. Moreover, the one or more locking ribs 354, 356 of the mating portion prevent the ear piece 312 from moving longitudinal relative to the receiver 308. In other words, the one or more locking ribs 354, 356 form a mechanical lock preventing the separation of the ear piece 312 from the receiver 308.

In addition to or instead of the one or more mechanical locks between the ear piece 312 and the receiver 308, a chemical bond may exist between the mating portion of the receiver and the ear piece. Depending on the materials of the receiver and the ear piece and the molding process, a chemical bond may be created between the two. For example, the ear piece and the receiver may both be formed from a plastic resin through a molding process. The receiver may be molded first and before the receiver is completely solidified or the receiver may be reheated, the mating portion of the receiver may be placed in or be part of a mold for the ear piece, as the resin for the ear piece solidifies, the resin of the mating portion and the resin of the ear piece may form a chemical bond at the interfaces of both resins.

In some embodiments, the lateral surface 352 defined by the shoulder of the receiver may serve as a wall of the mold for the ear piece 312 such that as the resin used for the ear piece is injected into the mold, the resin will be in direct contact with the lateral surface 352. Moreover, in such an embodiment, the mold for the ear piece may be configured such that ear piece includes a top surface 362, a bottom surface 364, an inner side surface 366 and an outer side surface 368 that line up with the top surface 336, the bottom surface 338, the inner side surface 340, and the outer side surface 342 of the main body 332 of the receiver. For example, together the top surface 336 of the main body and the top surface 362 of the ear piece may form a continuous (i.e., no breaks in the material) top surface 370 of the temple extending from the proximal end 304 of the temple to the distal end 306 of the temple. Similarly, the bottom surface 338 of the main body of the receiver and the bottom surface 364 of the ear piece may collectively form a continuous bottom surface 372 of the temple extending from the proximal end 304 of the temple to the distal end 306 of the temple. The inner side surface 340 of the main body of the receiver and the inner side surface 366 of the ear piece may collectively form a continuous inner side surface 374 of the temple extending from the proximal end 304 of the temple to the distal end 306 of the temple. The outer side surface 342 of the main body of the receiver and the outer side surface 368 of the ear piece may collectively form a continuous outer side surface 376 of the temple extending from the proximal end 304 of the temple to the distal end 306 of the temple.

Since the receiver 308 and the ear piece 312 are locked together, the support member 310 is also locked together with the receiver 308 and the ear piece 312 because the support member is completely surrounded by the these two locked elements 308, 310 (e.g., the proximal portion 326 of the support member is surrounded by and in direct contact with the receiver 308 and the distal portion 328 of the support member is surrounded by and in direct contact with the ear piece 312). Moreover, as described above, in some embodiments, the support member 310 may be further locked to the receiver 308 through one or more locks formed between the receiver 308 and the proximal portion of the support member 310.

Collectively the interlocked receiver 308, support member 310, and ear piece 312 form a temple. Although these elements 308, 310, 312 are interlocked and interconnected, each element may be formed by a different material. The receiver may be made from a tough rigid material. For example, the receiver may be made from a nylon, such as "ballistic nylon." Since the ear piece is in direct contact with the wearer's ear and side of his or her head, the material of the ear piece may be selected based on comfort and/or stickiness. For example, in order to prevent the eyeglasses from slipping off, the material of the ear piece may be selected in order to create or form a particular amount of friction between the wearer and the ear piece. As described above and as a specific example, the ear piece may be flexible and made from an elastomeric plastic material. The support member may be pliable, such as a brass rod. A pliable support member and a flexible ear piece allows for the wearer to shape the ear piece (with the inserted support member) to fit his or her ear. The interlocking or interconnection between the receiver, the support member, and the ear piece as described is configured to hold the elements together even as the flexible ear piece is being shaped by the wearer or during normal use. Moreover, it is believed that the interlocking and interconnection between the receiver, ear piece, and support member as described above is stronger and more durable than the conventional temple assembly having only the snap fit between the female end of the proximal portion and the male end of the distal portion.

Figure 7:
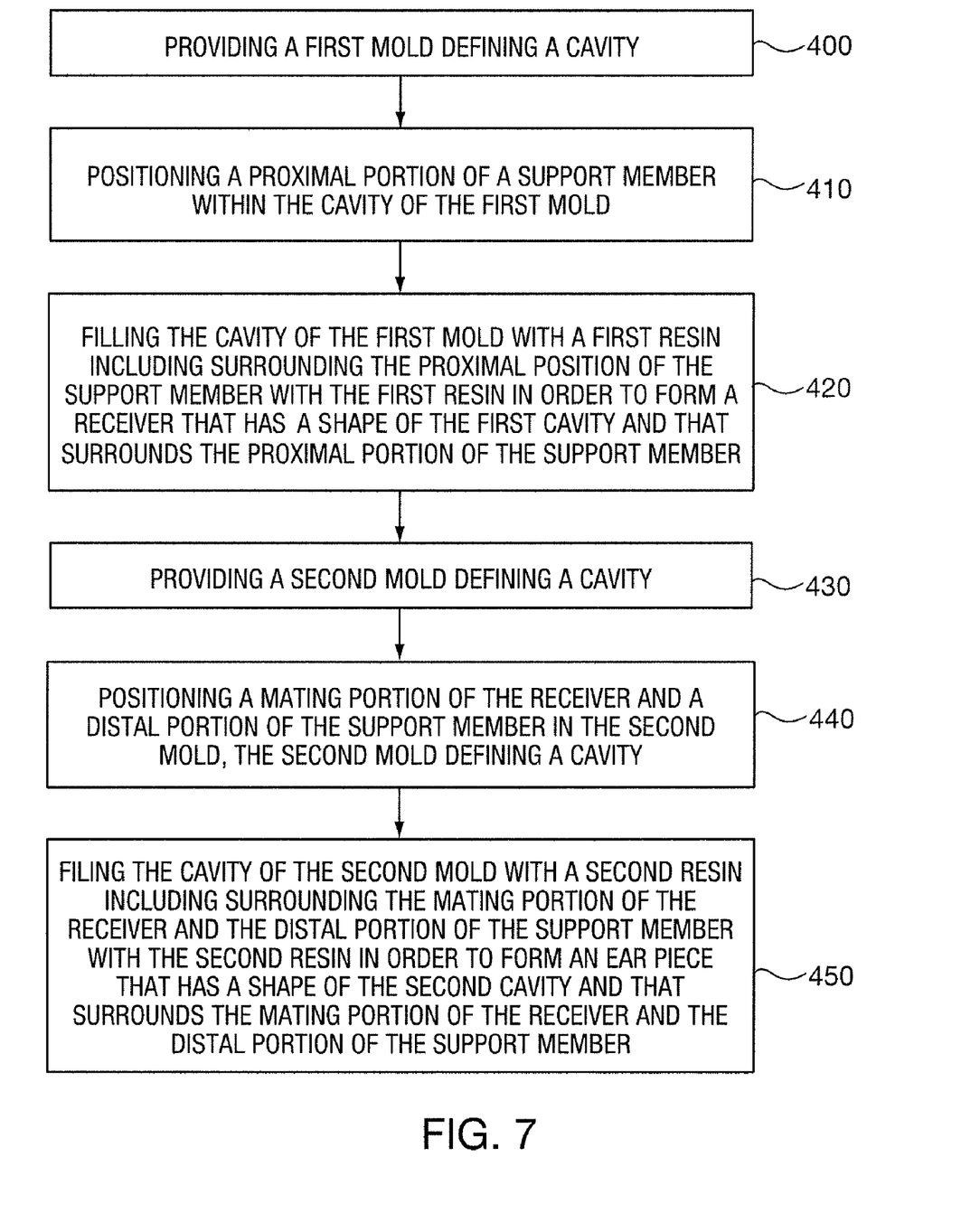
FIG. 7 is a flowchart illustrating a method according to yet another embodiment of the present invention.

FIG. 7 illustrates a method of forming a temple according to an embodiment of the present invention. The method may include providing a first mold defining a cavity 400; positioning a proximal portion of a support member within the cavity of the first mold 410; filling the cavity of the first mold with a first resin including surrounding the proximal position of the support member with the first resin in order to form a receiver that has a shape of the first cavity and that surrounds and is in direct contact with the proximal portion of the support member 420; providing a second mold defining a cavity 430; positioning a mating portion of the receiver and a distal portion of the support member in the second mold, the second mold defining a cavity 440; and filling the cavity of the second mold with a second resin including surrounding the mating portion of the receiver and the distal portion of the support member with the second resin in order to form an ear piece that has a shape of the second cavity and that surrounds and is direct contact with the mating portion of the receiver and the distal portion of the support member 450.

The first resin and the second resin may differ depending on the preferred characteristics of the receiver and the ear piece. For example, as explained above, the first resin for the receiver may be of a rigid plastic material, while the second resin for the ear piece may be of an elastomeric plastic material. The support member may be pliable such that the flexible ear piece with the inserted pliable support member provides an integrated ear piece that may be easily shaped by the wearer according to the wearer's preference.

The cavity of the first mold may be shaped to form one or more locking rings on the mating portion of the receiver. During the injection of the second resin around the mating portion and the forming of the ear piece, the locking rings create one or more mechanical locks between the ear piece and the receiver preventing the separation of the two. In some embodiments, the support member may be shaped to also create one or more mechanical locks between the support member and the receiver.

In some embodiments, the cavity of the first mold may be shaped to form a shoulder between the mating portion of the receiver and a main body of the receiver. The shoulder may define a lateral surface. The lateral surface may form part of the second mold such that the second resin is in direct contact with the lateral surface during the molding of the ear piece.

The cavity of the first mold may be shaped to form a top surface, a bottom surface, an inner side surface, and an outer side surface of the main body of the receiver. The cavity of the second mold may be shaped to form a top surface, a bottom surface, an inner side surface, and an outer side surface of the ear piece. Moreover, the shape and size of the cavity of the second mold may be configured to form the surfaces of the ear piece to line up with the surfaces of the main body of the receiver such that together the surfaces of the main body and the surfaces of the ear piece form continuous surfaces for the temple extending from a proximal end of the temple to a distal end of the temple.

Although the methods of above describe a first mold and a second mold, in some embodiments, the first mold and the second mold may be interconnected or portions of the same mold. A mold may include one or more partitions that form a first cavity of the first mold and a second cavity of the second mold. The proximal portion of the support member may extend into the first cavity and the distal portion of the support member may extend into the second cavity. In one configuration, the first and second cavities may be kept separated through the use of one or more partitions. In such an arrangement, the first resin may be injected into the first cavity to form the receiver. The partitions may correspond to the walls of the cavity that correspond to the mating portion. These partitions may be removed exposing only the mating portion to the second cavity. More specifically, the mating portion now forms walls in the second cavity. As the second resin is injected into the second cavity, the second resin will fill in around the mating portion. In some embodiments, the timing of the injection of the resins and the solidification of the resins may overlap. For example, the second resin may be injected prior to the removal of the partitions. Also, the injection of the second resin and the removal of the partitions may occur prior to the mating portion completely cooling in order to try to form a chemical bond between the first and second resins at the mating portion.

Embodiments of the present invention provide for an improved temple and associated eyeglasses frames and methods of making the same. The illustrated method allows for differing materials to be used for each element of the temple. As explained above, in some embodiments, the receiver may be a rigid tough material to provide strength and durability to the frame of the eyeglasses. The integrated ear piece, i.e., the ear piece and the inserted support member, provides a distal potion of the temple that is comfortable and shapeable to the individual wearer. Furthermore, the temple provides for the interlocking and interconnecting of the receiver, the support member, and the ear piece. It is believed that the manner in which the elements are locked is an improvement compared to conventional temples in both strength and/or appearance. For example, it is believed that the connections between the different elements of the temple, including the proximal portion of the support member being held within and in direct contact with the mating portion of the receiver and the ear piece being molded over the mating portion, are stronger and more durable than the conventional temple assembly that include separately molded pieces that are snapped together. Moreover, compared to this conventional temple assembly, the temple according to the illustrated embodiments allow for a more seamless look between the receiver and the ear piece, which may be more aesthetic pleasing.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A temple for an eyeglasses frame having a support section configured to support a pair of optical lenses, the temple comprising:

a receiver extending from a proximal end of the temple to a second end, the proximal end being configured to rotatably connect to the support section, the receiver defining a cavity extending from second end toward the proximal end of the temple;

a pliable support member having a proximal portion within the cavity and a distal portion extending out and away from the second end of the receiver; and a flexible ear piece extending around the pliable support member and at least the second end of the receiver;

wherein the flexible ear piece and the pliable support member form an integrated ear piece that is shapeable by a wearer; and wherein the receiver includes a mating portion that extends from the second end of the receiver toward the proximal end of the temple and the flexible ear piece extends around the mating portion, the mating portion includes one or more locking ribs that form one or more mechanical locks between the flexible ear piece and the receiver such that the flexible ear piece and the receiver are locked together.

2. The temple according to claim 1, wherein the main body includes a top surface, a bottom surface, an inner side surface, and an outer side surface and the ear piece including a top surface, a bottom surface, an inner side surface, and an outer side surface and together the top surface of the main body and the top surface of the ear piece form a continuous top surface of the temple extending from the proximal end of the temple to a distal end of the temple, together the bottom surface of the main body and the bottom surface of the ear piece form a continuous bottom surface of the temple extending from the proximal end of the temple to the distal end of the temple, together the inner side surface of the main body and the inner side surface of the ear piece form a continuous inner side surface of the temple extending from the proximal end of the temple to a distal end of the temple, and together the outer side surface of the main body and the outer side surface of the ear piece form a continuous outer side surface of the temple extending from the proximal end of the temple to a distal end of the temple.

3. The temple according to claim 1, wherein the cavity is shaped to correspond to the proximal portion of the pliable support member.

4. The temple according to claim 1, wherein the receiver is molded from a nylon material.

5. The temple according to claim 1, wherein the support member is a brass rod.

6. The temple according to claim 1, wherein the ear piece is molded from an elastomeric material.

7. A pair of eyeglasses comprising:
a first optical lens and a second optical lens;
a frame including a support section, a first temple, and a second temple, the support section being configured to support the first and second optical lenses, each temple having:
a receiver extending from a proximal end of the temple to a second end of the receiver, the proximal end being configured to rotatably connect to an end of the support section, the receiver defining a cavity extending from the second end toward the proximal end of the temple;
a support member having a proximal portion within the cavity and a distal portion extending out and away from the second end of the receiver; and
a flexible ear piece extending around the support member and at least the second end of the receiver;
wherein the receiver includes a mating portion that extends from the second end of the receiver toward the proximal end of the temple and the flexible ear piece extends around the mating portion, the mating portion includes one or more locking ribs that form one or more mechanical locks between the flexible ear piece and the receiver such that the flexible ear piece and the receiver are locked together.

8. The pair of eyeglasses according to claim 7, wherein the support section and the receiver of each temple is a rigid plastic, the support member of each temple is a pliable material, and the flexible ear piece of each temple is a flexible material and, for each temple, the ear piece and the distal portion of the support member form an integrated ear piece that is shapeable by a wearer.

9. The pair of eyeglasses according to claim 7, wherein, for each temple, the cavity is shaped to correspond to the proximal portion of the support member.

10. The pair of eyeglasses according to claim 7, wherein the support member is a rod.

11. The pair of eyeglasses according to claim 7, wherein, for each temple, a chemical bond exists between the mating portion of the receiver and the ear piece.

12. The pair of eyeglasses according to claim 7, wherein each receiver is molded from a nylon material.

13. The pair of eyeglasses according to claim 7, wherein each support member is a brass rod.

14. The pair of eyeglasses according to claim 7, wherein each ear piece is molded from an elastomeric material.

15. A method for forming a temple for an eyeglasses frame, the method comprising:
providing a first mold defining a cavity;
positioning a proximal portion of a support member within the cavity of the first mold;
filling the cavity of the first mold with a first resin including surrounding the proximal position of the support member with the first resin in order to form a receiver that has a shape of the first cavity and that surrounds the proximal portion of the support member;
providing a second mold defining a cavity;
positioning a mating portion of the receiver and a distal portion of the support member in the second mold, the second mold defining a cavity;
filling the cavity of the second mold with a second resin including surrounding the mating portion of the receiver and the distal portion of the support member with the second resin in order to form an ear piece that has a shape of the second cavity and that surrounds the mating portion of the receiver and the distal portion of the support member;
wherein the cavity of the first mold is shaped to form a shoulder between the mating portion of the receiver and a main body of the receiver, the shoulder defining a lateral surface that forms part of the second mold such that the second resin is in direct contact with the lateral surface during the molding of the ear piece.

16. The method according to claim 15, wherein the operation of filling the cavity of the first mold with a first resin includes the first resin being of a rigid plastic material and the operation of the filling the cavity of the second mold with a second resin includes the second resin being of a flexible material.

17. The method according to claim 15, wherein the operation of positioning a proximal portion of a support member within the cavity of the first mold includes the support member being pliable.

18. The method according to claim 15, wherein each mold includes at least one removable partition, and wherein the operation of filling the cavity of the second mold with a second resin occurs prior to removal of the partitions so as to form a chemical bond between the first and second resins at the mating portion.

* * * * *